United States Patent
Kato et al.

(10) Patent No.: US 9,205,772 B2
(45) Date of Patent: Dec. 8, 2015

(54) MOVABLE PLATFORM, OVERHEAD TRAVELING VEHICLE SYSTEM, AND METHOD FOR VERTICALLY MOVING OVERHEAD TRAVELING VEHICLE

(75) Inventors: Hideki Kato, Ise (JP); Tatsuo Tsubaki, Ise (JP)

(73) Assignee: MURATA MACHINERY, LTD., Kyoto (JP)

(*) Notice: Subject to any disclaimer, the term of this patent is extended or adjusted under 35 U.S.C. 154(b) by 94 days.

(21) Appl. No.: 14/125,112

(22) PCT Filed: May 17, 2012

(86) PCT No.: PCT/JP2012/062612
§ 371 (c)(1),
(2), (4) Date: Dec. 10, 2013

(87) PCT Pub. No.: WO2012/172915
PCT Pub. Date: Dec. 20, 2012

(65) Prior Publication Data
US 2014/0090574 A1    Apr. 3, 2014

(30) Foreign Application Priority Data
Jun. 14, 2011  (JP) .................................. 2011-132121

(51) Int. Cl.
B60P 3/06       (2006.01)
B61B 3/02       (2006.01)
B61B 3/00       (2006.01)

(52) U.S. Cl.
CPC . B60P 3/068 (2013.01); B61B 3/00 (2013.01); B61B 3/02 (2013.01)

(58) Field of Classification Search
CPC .......... B61B 3/00; B61B 12/00; B61B 12/02; B61B 12/022; B61B 12/024; B61B 13/00; B61B 13/04; B61B 13/06
USPC ............... 104/88.01, 89–91, 96, 98, 106, 111
See application file for complete search history.

(56) References Cited

FOREIGN PATENT DOCUMENTS

| JP | 05-82734 | * | 4/1992 | .............. B61B 13/06 |
| JP | 05-82734 U | | 11/1993 | |
| JP | 2001-278575 A | | 10/2001 | |

OTHER PUBLICATIONS

Official Communication issued in International Patent Application No. PCT/JP2012/062612, mailed on Jun. 12, 2012.

* cited by examiner

*Primary Examiner* — R. J. McCarry, Jr.
(74) *Attorney, Agent, or Firm* — Keating & Bennett, LLP

(57) ABSTRACT

A moving carriage that moves an overhead travelling vehicle that has been unloaded to the ground, includes a frame including travelling wheels, elevating mechanisms provided at a plurality of locations on the frame along a longitudinal direction of the frame, a track for an overhead travelling vehicle, the track being supported by the elevating mechanisms so as to be lifted and lowered and being configured to allow the overhead travelling vehicle to be transferred to and from another track, and a synchronizing mechanism that synchronizes the elevating mechanisms to lift and lower the track by the same or substantially the same amount.

5 Claims, 4 Drawing Sheets

MOVABLE PLATFORM, OVERHEAD TRAVELING VEHICLE SYSTEM, AND METHOD FOR VERTICALLY MOVING OVERHEAD TRAVELING VEHICLE

BACKGROUND OF THE INVENTION

1. Field of the Invention

The present invention relates to a moving carriage for use in an overhead travelling vehicle system.

2. Description of the Related Art

With an overhead travelling vehicle system, an overhead travelling vehicle travels along a travelling track provided in an overhead space. In this respect, in order to load the overhead travelling vehicle onto the travelling track or unload the overhead travelling vehicle from the travelling track to the ground, it has been known that a portion of the travelling track is configured to be freely separated from and connected with the other portions of the travelling track and is lifted and lowered between the ground and the height position of the travelling track by a lifter (JP Utility H5-82734, JP 2001-278575).

On the ground, the overhead travelling vehicle is stored and placed on a moving carriage, and the moving carriage includes a short track for an overhead travelling vehicle and this track supports the overhead travelling vehicle. Here, it is convenient if the overhead travelling vehicle can be transferred with ease between moving carriages, but it is difficult to align the heights of the tracks provided to the moving carriages. For this reason, the overhead travelling vehicle is transferred between the moving carriages via a lifter. In this case, however, the lifter is used for a purpose different from its intended purpose, which is to lift and lower the overhead travelling vehicle between the ground and an elevated place.

SUMMARY OF THE INVENTION

Preferred embodiments of the present invention lift and lower a track provided to a moving carriage with ease while keeping the track horizontal.

A moving carriage according to a preferred embodiment of the present invention is a moving carriage that moves an overhead travelling vehicle that has been lowered to the ground and includes a frame including travelling wheels; elevating mechanisms provided at a plurality of locations on the frame along a longitudinal direction of the frame; a track for the overhead travelling vehicle, the track being supported by the elevating mechanisms so as to be lifted and lowered and being configured to allow the overhead travelling vehicle to be transferred to and from another track; and a synchronizing mechanism configured to synchronize the elevating mechanisms so as to lift and lower the track for an overhead travelling vehicle by the same or substantially the same amount.

According to another preferred embodiment of the present invention, an overhead travelling vehicle system includes a moving carriage including a frame including travelling wheels; elevating mechanisms provided at a plurality of locations on the frame along a longitudinal direction of the frame; a track for the overhead travelling vehicle, the track being supported by the elevating mechanisms so as to be lifted and lowered and being configured to allow the overhead travelling vehicle to be transferred to and from another track; and a synchronizing mechanism configured to synchronize the elevating mechanisms so as to lift and lower the track for the overhead travelling vehicle by the same or substantially the same amount; a travelling track provided at an elevated place and along which the overhead travelling vehicle travel; an overhead travelling vehicle; a lifter configured to lift and lower the overhead travelling vehicle between the travelling track and the ground in a state in which the overhead travelling vehicle is supported by a track configured to be connected with the travelling track; and another moving carriage including another frame with travelling wheels and another track for the overhead travelling vehicle, wherein the another frame is configured to support the another track at a fixed height. In the present specification, the descriptions related to a moving carriage also directly apply to the lifting/lowering direction of an overhead travelling vehicle system and an overhead travelling vehicle.

Further, a method for lifting and lowering an overhead travelling vehicle according to another preferred embodiment of the present invention is a method for lifting and lowering an overhead travelling vehicle that has been lowered to the ground, while keeping the overhead travelling vehicle horizontal, including a step for providing the above-described moving carriage; a step for transferring an overhead travelling vehicle to the track for an overhead travelling vehicle; and a step for lifting and lowering the elevating mechanisms in synchronization by the same or substantially the same amount by the synchronizing mechanism.

According to various preferred embodiments of the present invention, the height of the track may be adjusted such that the track is lifted and lowered by the same or substantially the same amount at its front and rear of the carriage. Thus, it is easy to transfer the overhead travelling vehicle, for example, between moving carriages. Moreover, a plurality of front and rear elevating mechanisms are synchronized by the synchronizing mechanism, and thus the height of the track may be adjusted while keeping the track horizontal. The moving carriage according to various preferred embodiments of the present invention may be used, for example, as a maintenance carriage to perform maintenance on an overhead travelling vehicle. The overhead travelling vehicle is transferred from a moving carriage that does not include any elevating mechanisms for a track and maintenance is performed on the overhead travelling vehicle. After maintenance, the overhead travelling vehicle is transferred to the moving carriage that does not include any elevating mechanisms for a track and is stored there.

Preferably, each of the elevating mechanisms provided at the plurality of locations includes a shaft extending across the frame in a width direction of the moving carriage; a member to which the track for an overhead travelling vehicle is attached and which is pivotably connected with the shaft; and an axis pivotably supported by the frame and disposed eccentrically relative to the center of the shaft, a driving member configured to pivot the axis is further provided in one of the plurality of elevating mechanisms, and the synchronizing mechanism includes a link or a chain configured to connect the plurality of shafts. Pivoting the axis that is disposed eccentrically relative to the center of the shaft enables the shaft and the track to be lifted and lowered. Further, since the shaft extends across the frame, the track may be lifted and lowered by the same amount at both sides of the frame in the width direction. Then, when the front and rear shafts are connected by a link member, the track and the link member constitute a parallel link, and thus the track may be lifted and lowered by the same or substantially the same amount at the front and rear of the moving carriage. Instead of providing the link member, it is also possible to lift and lower the track by the same or substantially the same amount at the front and rear of the moving carriage by connecting the front and rear shafts by a chain such that the front and rear shafts pivot at the same rotating angle. To achieve these results, the track may be lifted and lowered by the same amount by a single driving member, while supporting the track, for example, at four locations at the front, rear, left, and right of the moving carriage. Note that when no shaft is provided, driving members such as ball screws are provided at the left and right of the moving carriage in the width direction. However, the height adjustment becomes troublesome, and it is difficult to lift and lower the track at its left and right sides uniformly.

Particularly preferably, the track for an overhead travelling vehicle includes a connecting member for connection with a track of another moving carriage. This allows the tracks of moving carriages to be connected when the overhead travelling vehicle is transferred between the moving carriages. Accordingly, when the overhead travelling vehicle is transferred between the moving carriages, there will not be situations where the tracks of the moving carriages become separated by the downward force due to gravity from the overhead travelling vehicle, where impact is exerted on the overhead travelling vehicle due to a gap between the tracks, and the like.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

The following describes preferred embodiments for carrying out the present invention. The scope of the present invention is based on the claims, and is intended to be determined in accordance with the understanding of a person skilled in the art with reference to the description of the present invention and related art in the field of the present invention.

Figure 1:
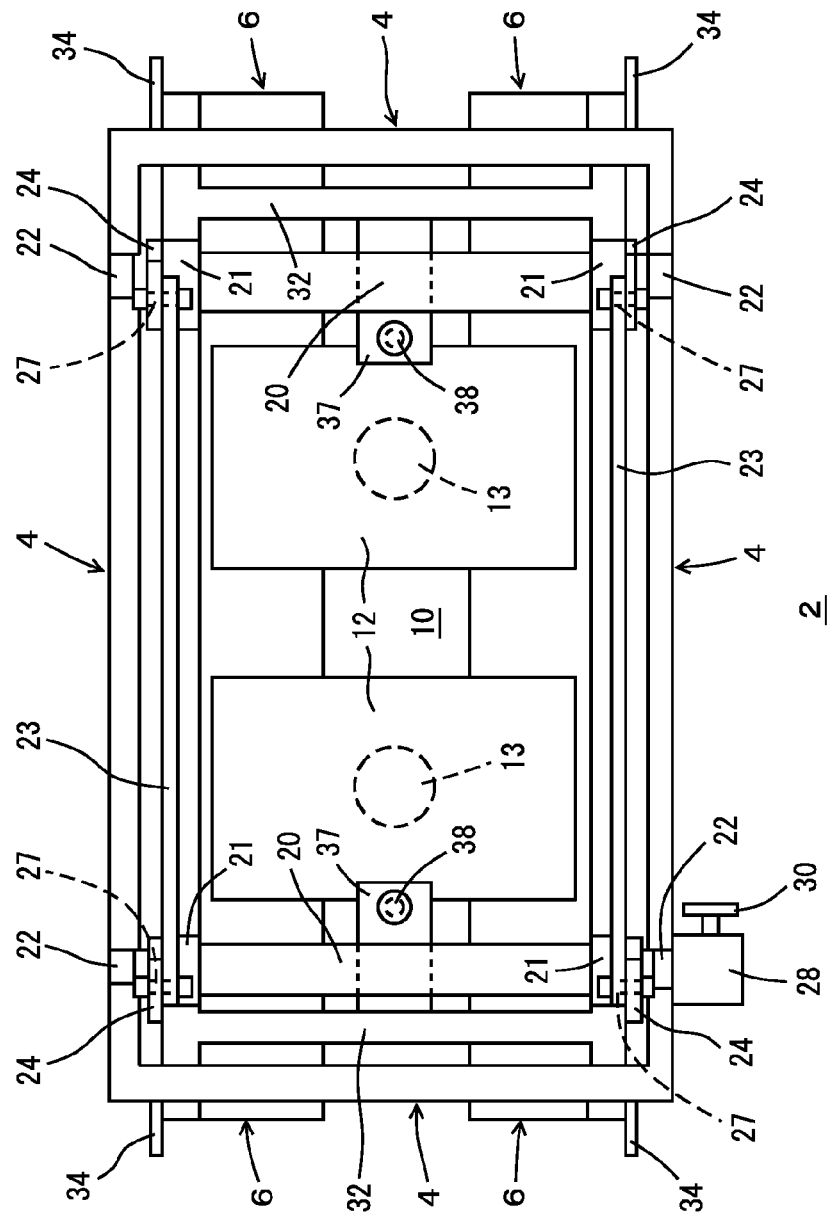
FIG. 1 is a plan view of a moving carriage according to a preferred embodiment of the present invention.
Figure 2:
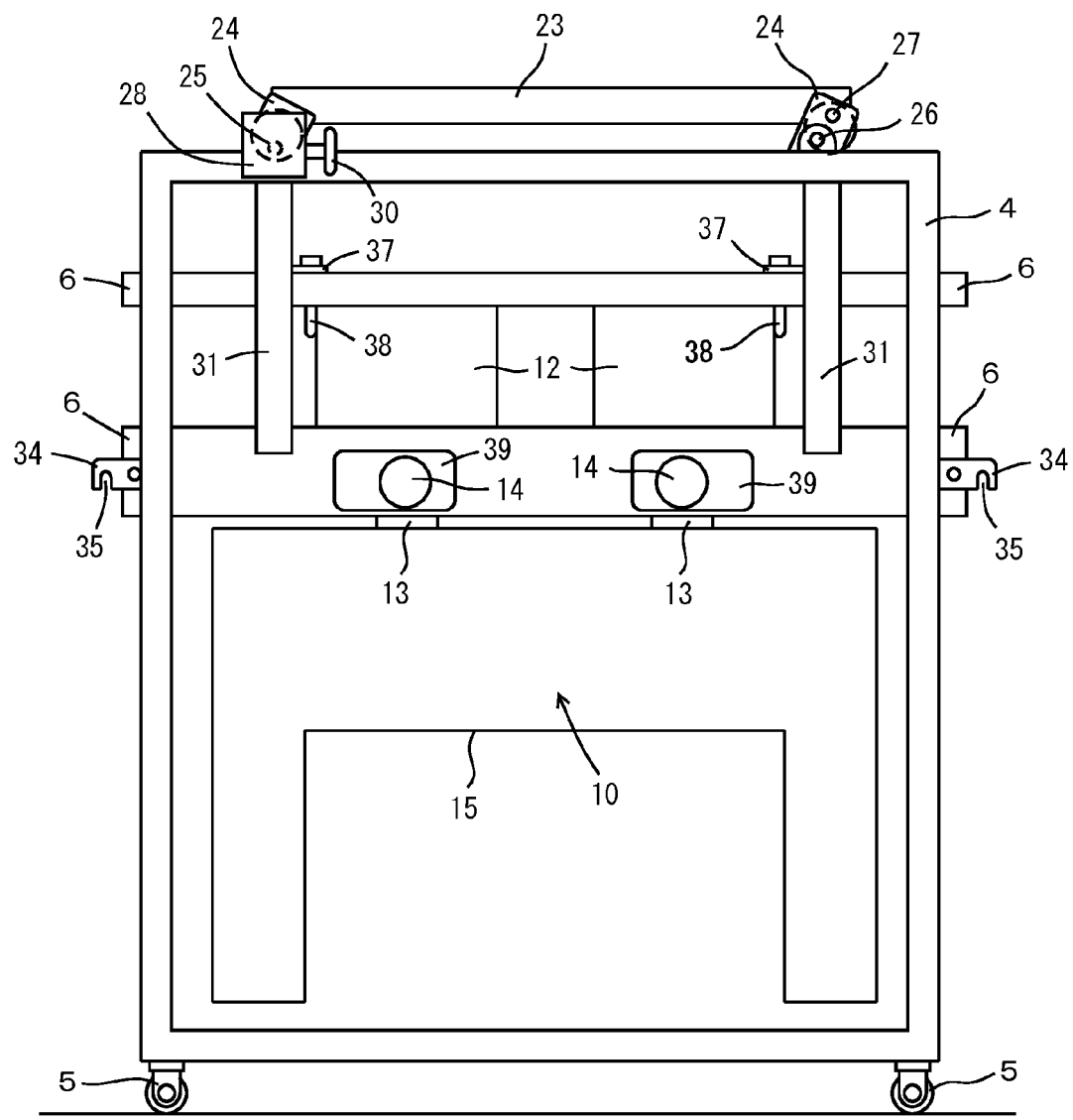
FIG. 2 is a side view of the moving carriage according to a preferred embodiment of a present invention.

FIGS. 1 to 6 show a moving carriage 2 and an overhead travelling vehicle system 60 according to a preferred embodiment of the present invention. In each of the drawings, reference numeral 2 denotes a moving carriage, which is used to carry and move an overhead travelling vehicle 10 that has been unloaded from a travelling track 61 in FIG. 6 to the ground. As shown in FIGS. 1 and 2, for example, four caster wheels 5 are attached to a frame 4 of the moving carriage 2, and a track 6 that supports the overhead travelling vehicle 10 is supported by the frame 4, for example, at four locations at the front, rear, left, and right. The overhead travelling vehicle 10 includes, for example, a pair of front and rear bogie carriages 12, supports the overhead travelling vehicle body 15 by rods 13, and a travelling roller 14 of each bogie carriage 12 is supported by the track 6. Note that the structure of the overhead travelling vehicle 10 is unrestricted.

The moving carriage 2 includes, for example, a pair of front and rear elevating mechanisms, and the front and rear elevating mechanisms lift and lower the track 6 in synchronization while keeping the track 6 horizontal. Each elevating mechanism includes a shaft 20, and the shaft 20 extends laterally across the frame 4 in the width direction of the moving carriage 2. As used herein, the "front-rear direction" is the longitudinal direction of the moving carriage 2 and also is the direction in which the moving carriage 2 travels, and the "width direction" is a direction orthogonal to the longitudinal direction in a horizontal plane and is the short side direction of the moving carriage 2. Bearings 21 and 22 such as spherical bearings are provided at left and right ends of each shaft 20, and the bearings may be of any type. Each bearing 21 is fixed to a supporting member 31 for the track 6, and the bearing 22 is fixed to the frame 4. Additionally, the front and rear shafts 20 are connected by, for example, a pair of left and right link members 23 via the plate 24. Reference numeral 25 denotes a central rod of the shaft 20. The central rod 25 is supported by the bearing 21, and the bearing 21 supports the track 6 via the supporting member 31 shown in FIG. 2. Further, the plate 24 is attached pivotably to the central rod 25. The shaft 20 or the plate 24 is provided with an eccentric rod 26, which is eccentric relative to the center of the shaft 20, and the eccentric rod 26 is supported by the frame 4 via the bearing 22. The shaft 20, the bearings 21 and 22, the plate 24, and the rods 25 and 26 constitute an elevating mechanism.

Figure 3:
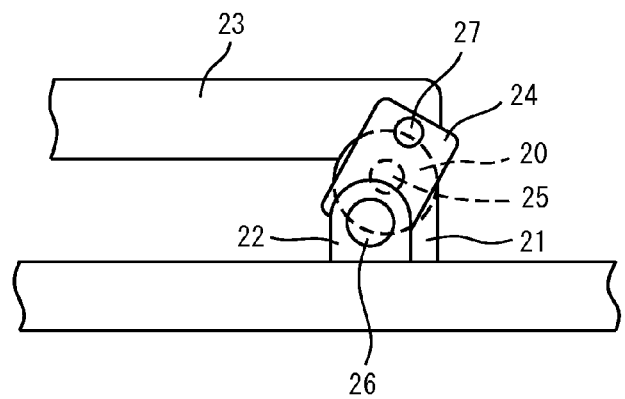
FIG. 3 is a side view showing rods of an eccentric shaft according to a preferred embodiment of the present invention.

FIG. 3 shows the members disposed in the neighborhood of the shaft 20. The eccentric rod 26 is provided at a position eccentric to the central rod 25 of the shaft 20. Here, in order to increase the amount of eccentricity, the eccentric rod 26 is attached to the plate 24 that is fixed to the central rod 25, rather than being attached directly to the shaft 20. Rotating the shaft 20 about the eccentric rod 26 results in a change in the height of the central rod 25, which also results in a change in the height of the track 6. Then, the shaft 20 pivots by the same pivoting angle at the left and right ends, and thus the track 6 is lifted and lowered without being tilted in the left-right direction. Additionally, the link members 23 allows the front and rear elevating mechanisms to be lifted and lowered by the same amount within the range of mechanical errors.

Reference numeral 28 denotes a driving member. The driving member 28 is attached to the frame 4, and includes a handle 30 whose rod is provided with a worm, and a worm gear 29 shown in FIG. 4. Upon rotation of the handle 30, the worm gear 29 is pivoted by the worm and acts as a speed reducer for the rotation of the handle 30. Since the handle 30 is not rotated by the worm gear 29, it also acts as a stopper.

The track 6 is divided into left and right sections in the width direction, and the divided sections are connected with each other, for example, by a beam 32. Further, when the moving carriage 2 is connected to other moving carriages, including, for example, transporting carriages 64 shown in FIG. 6, it is preferable to connect the tracks for an overhead travelling vehicle with each other. Therefore, connecting members 34, each of which includes an engaging member such as a hook 35, are pivotably provided, for example, at four locations at the front, rear, left and right of the track 6, and the engaging members are connected with engaging members, such as pins, that are provided on the tracks of the other moving carriages. Note that the pins or the like may be provided on the connecting members 34. Any member may be used as the connecting members as long as it connects the track of the moving carriage 2 with the tracks of the other moving carriages.

The overhead travelling vehicle 10 supported on the track 6 may be moved using a travelling roller 14. Thus, for example, a stopper 38 is removably latched to the plate 37 that is attached to the beam 32. Setting the stopper 38 causes the overhead travelling vehicle 10 to be locked as shown in FIG. 2, and removing the stopper causes the overhead travelling vehicle 10 to be unlocked. Preferably, the track 6 is provided with openings 39 such that maintenance of the overhead travelling vehicle, such as the replacement of the travelling roller 14, may be performed.

Figure 4:
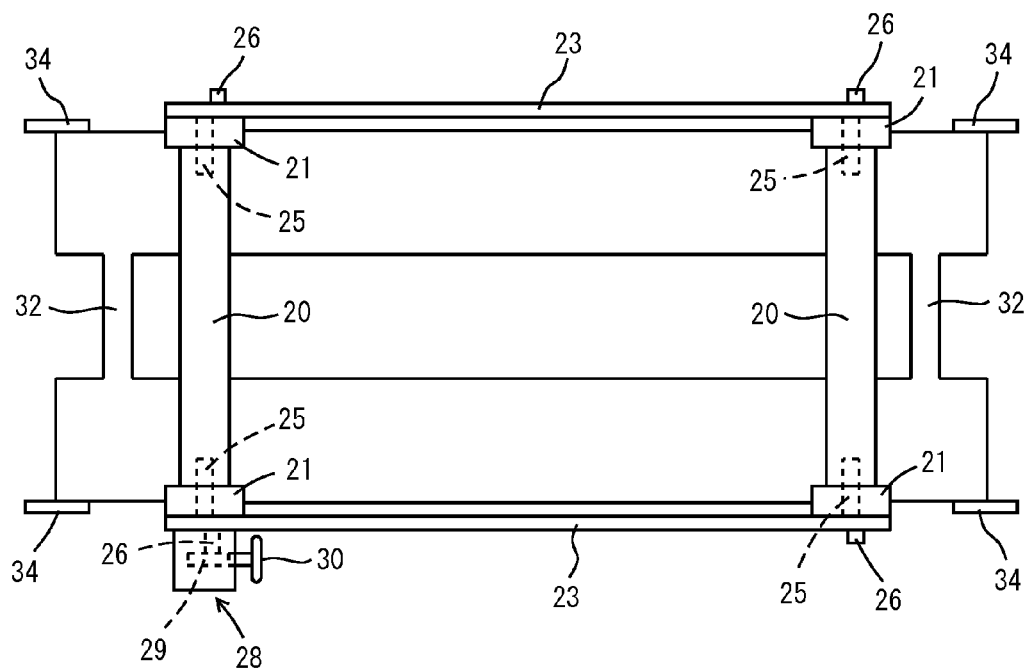
FIG. 4 is a plan view of elevating mechanisms for a track according to a preferred embodiment of the present invention.

FIG. 4 shows elevating mechanisms for a track 6 according to the present preferred embodiment. Rotating the handle 30 causes the worm of the handle 30 to rotate, which in turn causes rotation of the worm gear 29 meshing with the worm and such that a single eccentric axis 26 pivots. Pivoting of the eccentric axis 26 causes the central axis 25 of each shaft 20 to be lifted and lowered symmetrically at the left and right ends. The track 6 and the link member 23 constitute a parallel link, with the supporting member 31 and the plate 24 disposed therebetween. Accordingly, the front and rear shafts 20 rotate in synchronization, and the track 6 is lifted and lowered while being kept horizontal at its front, rear, left, and right. In this way, the height of the track 6 is adjusted.

Figure 5:
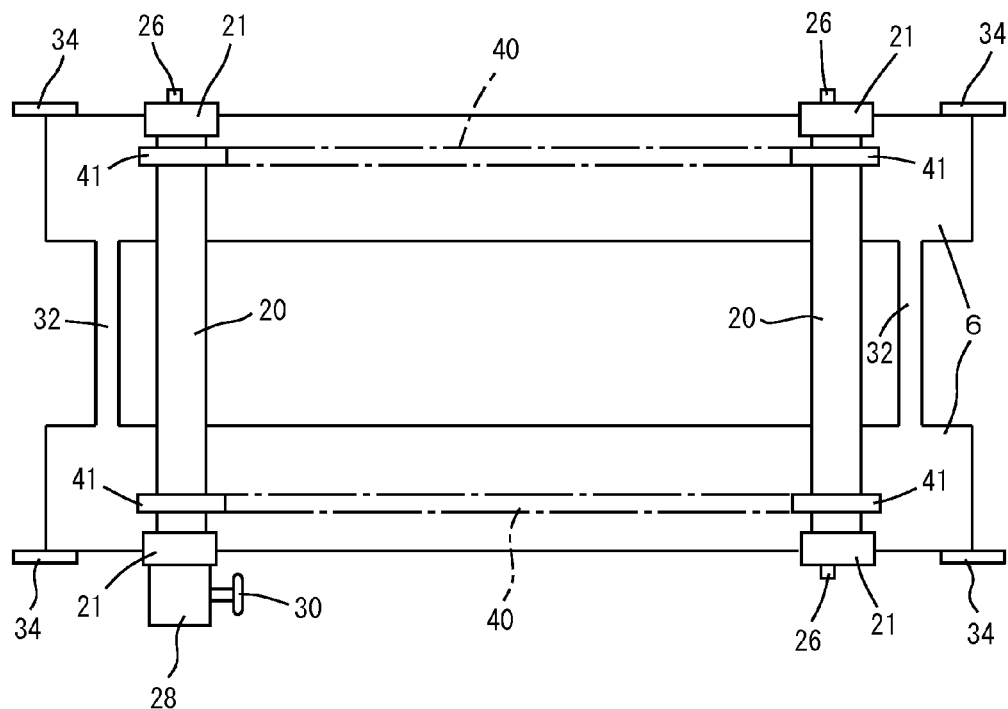
FIG. 5 is a plan view of elevating mechanisms for a track according to a modification of a preferred embodiment of the present invention.

Although the link member 23 is used to synchronize the front and rear shafts 20 in the preferred embodiment, it is also possible to use a chain. Such an example is shown in FIG. 5. Reference numeral 40 denotes a chain connecting the front and rear shafts 20 with each other, and a pair of left and right chains are provided. Reference numeral 41 denotes a sprocket that meshes with each chain 40. Here, when one of the shafts pivots, the other shaft also pivots at the same pivoting angle due to the presence of the chain 40, and as a result, the synchronization between the shafts 20 is maintained.

Figure 6:
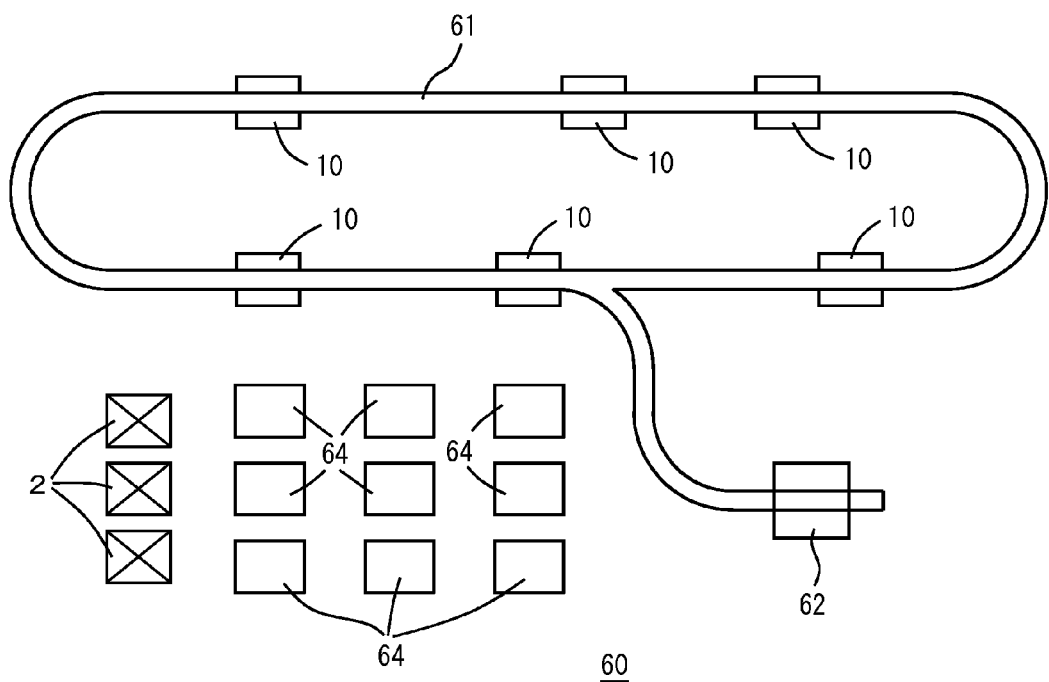
FIG. 6 is a plan view of an overhead travelling vehicle system according to a preferred embodiment of the present invention.

FIG. 6 shows an overhead travelling vehicle system 60 according to the present preferred embodiment. Reference numeral 61 denotes a travelling track, which is provided in the overhead space in a clean room, for example, and a plurality of overhead travelling vehicles 10 travel along the travelling track. A lifter 62 is connected with a portion of the travelling track 61, and the lifter 62 lifts and lowers a track connected with the travelling track 61 between the ground and the overhead space, thus lifting and lowering the overhead travelling vehicles 10 between the overhead space and the ground. A plurality of transporting carriages 64 and moving carriages 2 according to the present preferred embodiment are disposed on the ground. The transporting carriages 64 are used to store the overhead travelling vehicles 10, and tracks to support the overhead travelling vehicles are supported by a frame equipped with caster wheels or the like.

The lifter 62 finely adjusts the height of the overhead travelling vehicles, and thus, the overhead travelling vehicles are smoothly transferred, for example, between the moving carriage 2 and the transporting carriage 64, and between the moving carriage 2 and the lifter 62. Then, maintenance or the like is performed on a moving carriage 2 to which an overhead travelling vehicle has been transferred from the lifter 62. During this time, the overhead travelling vehicle is fixed using, for example, the stoppers 38 shown in FIG. 2. After completion of maintenance or the like, the moving carriage 2 is connected with a transporting carriage 64, and their tracks are connected by the connecting member 34. Then, the stopper 38 is removed so as to cause the overhead travelling vehicle to be transferred to the transporting carriage 64 and stored there. The elevating mechanism of the present preferred embodiment may be provided on the track of the transporting carriage 64, but this is inefficient because the number of the transporting carriages 64 is greater than that of the moving carriages 2. Although the moving carriage 2 is used as a carriage for maintenance in this preferred embodiment, the use of the moving carriage 2 is not limited to maintenance. Further, the eccentric rod 26 may be pivoted by a motor or the like instead of the handle 30.

The above preferred embodiment has the following advantageous effects.

Pivoting the handle 30 causes the shaft 20 connected with the driving member 28 to be lifted and lowered, and at this time, the shaft is lifted and lowered by the same or substantially the same amount at its left and right sides. The front and rear shafts 20 are connected by the link member 23, and thus are lifted and lowered in synchronization. Accordingly, a total of four locations, namely, the left and right ends of the front and rear shafts 20 are lifted and lowered by the same lifting and lowering amounts. Thus, the track 6 is lifted and lowered while being kept horizontal at its front, rear, left, and right.

The connecting member 34 allows the track of the transporting carriage 64 to be connected with the track 6 of the moving carriage 2.

The stopper 38 allows the overhead travelling vehicle 10 to be fixed to the track 6.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

LIST OF REFERENCE NUMERALS

2 Moving carriage
4 Frame
5 Caster wheel
6 Track
10 Overhead travelling vehicle
12 Bogie carriage
13 Axis
14 Travelling roller
15 Overhead travelling vehicle body
20 Shaft
21, 22 Bearing
23 Link member
24 Plate
25 Central axis
26 Eccentric axis
28 Driving member
29 Worm gear
30 Handle
31 Supporting member
32 Beam
34 Connecting member
35 Hook
37 Plate
38 Stopper
39 Opening
40 Chain
41 Sprocket
60 Overhead travelling vehicle system
61 Travelling track
62 Lifter
64 Transporting carriage

What is claimed is:

1. A moving carriage for moving an overhead travelling vehicle lowered to the ground, the moving carriage comprising:
a frame including travelling wheels;

a plurality of elevating mechanisms respectively provided at a plurality of locations on the frame along a longitudinal direction of the frame;

a track for the overhead travelling vehicle, the track being supported by the plurality of elevating mechanisms so as to be lifted and lowered and being configured to allow the overhead travelling vehicle to be transferred to and from another track; and a synchronizing mechanism configured to synchronize the plurality of elevating mechanisms so as to lift and lower the track for an overhead travelling vehicle by a same amount or substantially a same amount; wherein the plurality of elevating mechanisms includes at least one front elevating mechanism located at a front of the frame and at least one rear elevating mechanism located at a rear of the frame, with respect to a traveling direction of the overhead travelling vehicle.

2. The moving carriage according to claim 1, wherein each of the plurality of elevating mechanisms respectively provided at the plurality of locations includes:

a shaft extending across the frame in a width direction of the moving carriage;

a member to which the track is attached, the member being pivotably connected with the shaft; and an axis pivotably supported by the frame and disposed eccentrically relative to a center of the shaft; wherein a driving member configured to pivot the axis is further provided in one of the plurality of elevating mechanisms; and the synchronizing mechanism includes a link or a chain configured to connect the plurality of shafts.

3. The moving carriage according to claim 1, wherein the track includes a connecting member for connection with the another track.

4. An overhead travelling vehicle system comprising:
an overhead travelling vehicle;
a moving carriage including:
  a frame including travelling wheels;
  a plurality of elevating mechanisms respectively provided at a plurality of locations on the frame along a longitudinal direction of the frame;
  a track for the overhead travelling vehicle, the track being supported by the plurality of elevating mechanisms so as to be lifted and lowered and being configured to allow the overhead travelling vehicle to be transferred to and from another track; and
  a synchronizing mechanism configured to synchronize the plurality of elevating mechanisms so as to lift and lower the track for the overhead travelling vehicle by a same amount or substantially a same amount;

a travelling track provided at an elevated location and along which the overhead travelling vehicle travels;

a lifter configured to lift and lower the overhead travelling vehicle between the travelling track and the ground in a state in which the overhead travelling vehicle is supported by a track configured to be connected with the travelling track; and another moving carriage including another frame with travelling wheels and another track for the overhead travelling vehicle, wherein the another frame is configured to support the another track at a fixed height; wherein the plurality of elevating mechanisms includes at least one front elevating mechanism located at a front of the frame and at least one rear elevating mechanism located at a rear of the frame, with respect to a traveling direction of the overhead travelling vehicle.

5. A method for lifting and lowering an overhead travelling vehicle lowered to the ground, while keeping the overhead travelling vehicle horizontal, the method comprising the steps of:

providing a moving carriage including:
  a frame including travelling wheels;
  a plurality of elevating mechanisms respectively provided at a plurality of locations on the frame along a longitudinal direction of the frame;
  a track for the overhead travelling vehicle, the track being supported by the plurality of elevating mechanisms so as to be lifted and lowered and being configured to allow the overhead travelling vehicle to be transferred to and from another track; and
  a synchronizing mechanism configured to synchronize the plurality of elevating mechanisms so as to lift and lower the track for an overhead travelling vehicle by a same amount or a substantially same amount;

transferring the overhead travelling vehicle to the track; and driving the plurality of elevating mechanisms in synchronization by a same amount or a substantially same amount by the synchronizing mechanism; wherein the plurality of elevating mechanisms includes at least one front elevating mechanism located at a front of the frame and at least one rear elevating mechanism located at a rear of the frame, with respect to a traveling direction of the overhead travelling vehicle.

* * * * *